United States Patent [19]

Asai

[11] Patent Number: 4,928,126

[45] Date of Patent: May 22, 1990

[54] INK CONTAINER WITH DUAL-MEMBER SEALING CLOSURE

[76] Inventor: Naohito Asai, 30-2, 3-chome, Shimomaruko, Ohta-ku, Tokyo, Japan

[21] Appl. No.: 332,386

[22] Filed: Apr. 3, 1989

Related U.S. Application Data

[63] Continuation of Ser. No. 57,740, Jun. 3, 1987, abandoned, which is a continuation of Ser. No. 693,172, Jan. 22, 1985, abandoned.

[30] Foreign Application Priority Data

Feb. 9, 1984 [JP] Japan .................................. 59-20849

[51] Int. Cl.5 .......................... G01D 15/16; B41J 3/04

[52] U.S. Cl. ................................ 346/140 R; 144/329; 215/247

[58] Field of Search ................ 346/140; 141/329, 330; 215/247

[56] References Cited

U.S. PATENT DOCUMENTS

| | | | |
|---|---|---|---|
| 3,092,278 | 6/1963 | Jarnhall | 215/247 |
| 3,198,368 | 8/1965 | Kirkland | 215/247 |
| 3,463,339 | 8/1969 | McGuckin | 215/247 |
| 3,496,969 | 2/1970 | Bruce | 141/329 X |
| 3,551,273 | 12/1970 | McKinney | 215/247 X |
| 4,162,501 | 7/1979 | Mitchell | 346/140 |
| 4,366,912 | 1/1983 | Matukura | 215/247 |
| 4,415,886 | 11/1983 | Kyogoku et al. | 340/618 |
| 4,419,678 | 12/1983 | Kasugayama et al. | 346/140 R |
| 4,429,320 | 1/1984 | Hattori | 346/140 |
| 4,447,820 | 5/1984 | Terasawa | 346/140 |
| 4,709,249 | 11/1987 | Hanagata | 346/140 R |
| 4,719,475 | 1/1988 | Kiyohara et al. | 346/140 R |

FOREIGN PATENT DOCUMENTS

| | | |
|---|---|---|
| 2543991 | 4/1977 | Fed. Rep. of Germany . |
| 2709730 | 9/1978 | Fed. Rep. of Germany . |
| 7833494 | 10/1978 | Fed. Rep. of Germany . |
| 57-24284 | 2/1982 | Japan . |

*Primary Examiner*—Joseph W. Hartary

[57] ABSTRACT

In an ink container having a container for storing ink therein, and an outlet pipe for directing the ink in the container outwardly thereof, the outer end portion of the outlet pipe is mounted on a sealing elastic member formed by a dual structure comprising an elastic member of low gas permeability and an elastic member of small permanent set to thereby seal the container.

8 Claims, 6 Drawing Sheets

INK CONTAINER WITH DUAL-MEMBER SEALING CLOSURE

This application is a continuation of application Ser. No. 057,740, filed June 3, 1987, now abandoned, which is a continuation of application Ser. No. 693,172, filed Jan. 22, 1985, now abandoned.

BACKGROUND OF THE INVENTION

1. Field of the Invention

This invention relates to an ink container, and more particularly to an ink container used in an ink jet printer or the like.

2. Description of the Prior Art

In conventional ink jet recording apparatuses, especially, ink jet printers of the like, cartridge type ink containers are often used with the simplicity of ink replenishment taken into account.

The use of such a cartridge type ink container leads to the various advantages the ink replenishment can be accomplished simply by replacement of the container, that the judgment of the amount to be replenished is unnecessary and that contamination by ink hardly occurs during the replenishing operation.

On the other hand, the cartridge type container has suffered from the following disadvantages.

The dismounting of the cartridge type ink container with respect to a supply path for supplying the ink in the ink container to an ink jet head is generally effected by thrusting a hollow needle into or removing the hollow needle from the sealing member of the ink outlet pipe of the container. In such a system, where it is used for a long period of time, the sealing member formed of an elastic material such as rubber permits the permeation of gases and therefore bubbles may sometimes mix with the ink. Also, when a needle or similar pipe ha been left thrusted into the sealing member, leakage of the ink from the thrusted portion has sometimes occurred due to the permanent set of the sealing member after the needle has been removed therefrom.

Accordingly, an elastic material of small permeability and small permanent set has been desired as the sealing member, but it has been difficult to choose a material having both of these two characteristics.

SUMMARY OF THE INVENTION

The present invention has been made in view of the above-noted points and an object thereof is to provide simply and inexpensively an ink container in which bubbles do not mix with ink and the contamination by the leakage of the ink does not occur during replacement of the ink container.

DESCRIPTION OF THE PREFERRED EMBODIMENTS

Figure 1A:
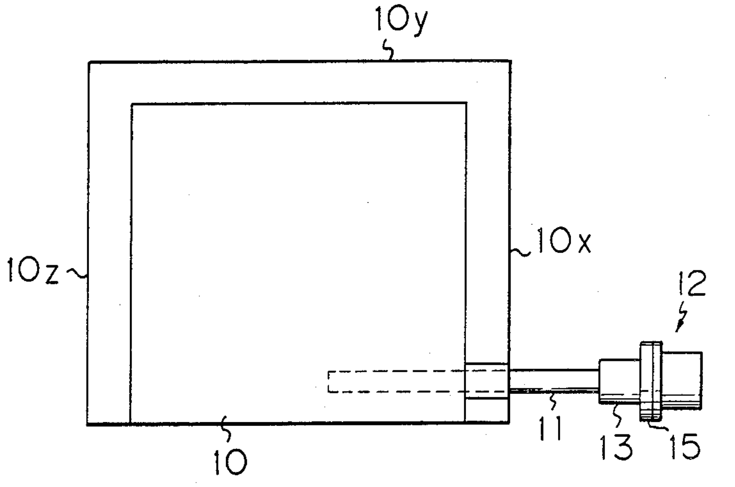
FIGS. 1A and 1B are a top plan view and a partly broken-away side view, respectively, illustrating an embodiment of the present invention.

The present invention will hereinafter be described in detail with respect to some embodiments shown in the drawings.

Figure 1B:
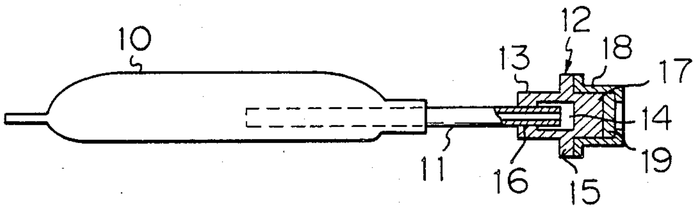

An embodiment of the ink cartridge or container of the present invention will first be described by reference to FIGS. 1A and 1B. FIG. 1A is a plan view of the ink container, and FIG. 1B is a partly broken-away side view thereof.

Reference numeral 10 designates a flexible ink bladder or bag-like container formed by folding a film formed by putting nylon on a polymeric film of two-layered structure such as polyethylene film, and joining the three side edges 10*x*, 10*y* and 10*z* thereof as by heat melting. An ink outlet pipe 11 as an ink outlet for directing the ink in the container 10 outwardly thereof is attached to the joined surface of one of the three side edges, 10*x*.

Reference numeral 12 designates a stepped pillar-shaped first coupling member formed of an elastic material such as rubber. A void 14 (this void 14 is not always necessary, but generally, when a sealing member and a needle or similar pipe are to be coupled together, it is difficult to make the axes of the two members completely coincident with each other and by providing such void 14, the inconvenience that ink is not supplied from the ink container is prevented even if the axes deviate more or less from each other) is provided in the large-diameter portion 15 of the coupling member 12, and a small hole 16 leading from the void 14 to the end face of the small-diametered portion 13 of the coupling member is formed. One end of the ink outlet pipe 11 attached to the bag-like container 10 is inserted into the void 14 through the small hole 16 and secured thereto.

The ink in the container 10 is sealed by the outer end portion 17 of the elastic member 12.

Reference numeral 19 denotes a pillar-shaped second member formed of an elastic material such as rubber similar to the coupling member 12. A metallic rigid ring 18 is annularly provided around the outer end portion 17 and the member 19 so that the outer end portion 17 and the member 19 are somewhat contracted by this ring 18.

As previously described, the elastic members 12 and 19 comprise a sealing closure member formed of a material such as rubber, but in the present invention, these members are formed of different materials.

First, for the elastic member 12, use may be made of a rubber material of low gas permeability such as Neoprene rubber (DuPont's trademark for polychloroprene rubber), nitrite rubber, isobutylene rubber or polysulfide rubber. Above all, butyl rubber is very small in permeability of various gases and excellent in durability to ink solvent and therefore is best suited. In the present embodiment, IIR 268 (trade name) produced by Japan Synthetic Rubber Co., Ltd. has been used to obtain the best result.

With regard to the elastic member 19, it is especially effective to form it of rubber whose compression set (the value measured in accordance with JIS, K6301-1975) is in a range less than 10% (70±1° C./22 hours). As the rubber applicable to the elastic member 19, mention may be made of silicone rubber urethane rubber, polyethylene chloride, epichlorohydrin rubber, nitrile rubber (N13R), isoprene rubber, butadiene rubber, chloroprene rubber or fluororubber.

Above all, silicon rubber is rich in elastic restitution force and very excellent in the degree of sealing of holes formed by a needle and the blockading capability for draft holes which will later be described in detail, and also excellent in durability to ink solvent and therefore is best suited.

In the present embodiment, Tore silicone SH841U (trade name: silicon rubber) has been used to obtain the best result.

Figure 1C:
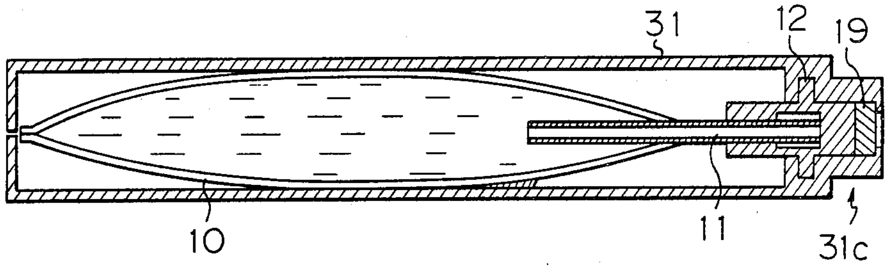
FIG. 1C is a cross-sectional view showing a modification of the embodiment of FIGS. 1A and 1B.

The adhesiveness between these two kinds of elastic materials is generally low and therefore, in the above-described embodiment, the metallic rigid ring 18 is annularly provided to thereby bring the elastic members 12 and 19 into intimate contact with each other, whereas the rigid ring 18 is not always necessary, but where the container 10 is contained in a case or housing 31 as shown in FIG. 1C, the inner side of the end portion 31C of the container may be formed so as to be in accord with the configurations of the elastic members 12 and 19 to thereby bring these elastic members into intimate contact with each other.

Figure 1D:
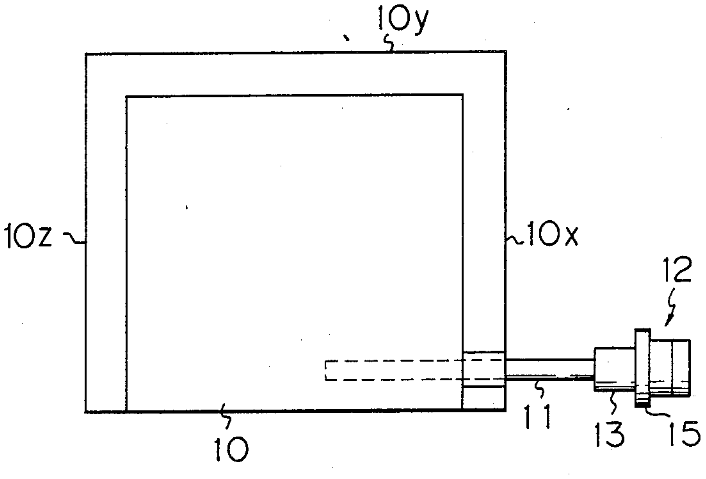
FIGS. 1D and 1E and FIGS. 1F and 1G are top plan views and partly broken-away side views, respectively, showing further embodiments of the present invention.
Figure 1E:
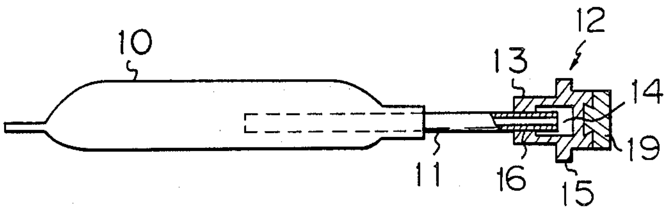
Figure 1F:
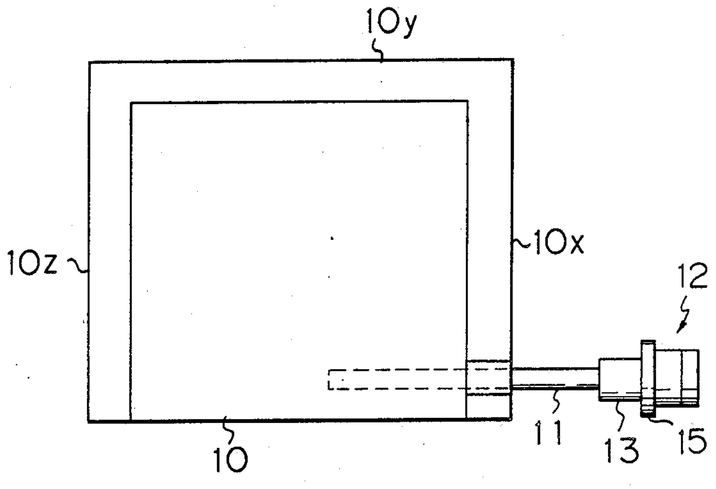
Figure 1G:
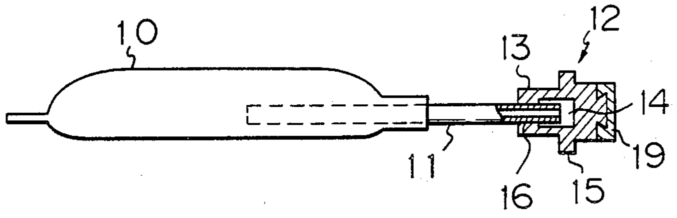

Also, as shown in FIGS. 1D and 1E or FIGS. 1F and 1G, tenons comprise fitting portions that may be provided in the elastic members 12 and 19 so that these members may be fitted to each other. In the case of FIGS. 1D and 1E, a tenon is formed in the elastic member 19, and in the case of FIGS. 1F and 1G, a tenon is formed in the elastic member 12. FIGS. 1D and 1E or FIGS. 1F and 1G are views similar to FIGS. 1A and 1B, and in these FIGS. members given similar reference numerals are common members and therefore need not be described in detail.

Figure 2:
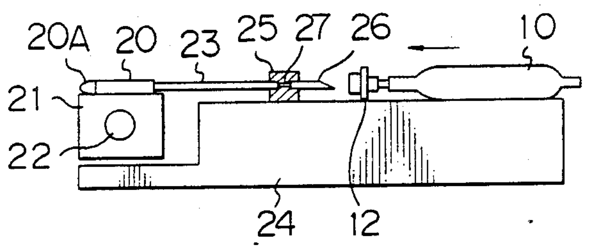
FIG. 2 illustrates the manner in which the ink container of the present invention is mounted on an ink jet recording apparatus.

FIG. 2 shows an example of an ink jet recording apparatus equipped with the ink container constructed as described above. In FIG. 2, reference numeral 20 designates a recording head fixed to a carriage 21. The carriage 21 is mounted for movement along a shaft 22 and is reciprocally movable along the shaft 22 under the control of a carriage driving motor (not shown). One end of a flexible ink supply path 23 is connected to the end of the recording head 20 which is opposite to a nozzle 20A.

The other end of the flexible ink supply path 23 is inserted in one end of a joint 25 secured to the base bed 24 of the ink jet recording apparatus. A needle-like line 26 is inserted in the other end of the joint 25, and the lines 23 and 26 are communicated with each other through a path 27 formed in the joint 25.

The flattened bag-like ink container of the present invention shown in FIGS. 1A and 1B is placed on the base bed 24 and moved in the direction of arrow, and the elastic member 12 thereof is urged against the needle-like line 26 and the needle-like line 26 is fitted into the elastic member 12, whereby the container 10 is mounted on the ink jet recording apparatus.

During this mounting, the sealing member comprising the elastic members 12 and 19 is passed through by the needle-like line 26, whereby the interior of the bag-like container 10 is communicated with the recording head.

When ink is discharged from the nozzle 20A of the recording head 20 to printing paper (not shown) to record characters or images thereon, ink is supplied from the ink container 10 to the recording head 20 by the surface tension of the recording head 20 through the supply path 23.

Even after the recording apparatus has been used or left unused for a long time with the container 10 mounted thereon, bubbles do not mix with the ink or the ink does not leak to contaminate the surroundings during the dismounting of the container because the sealing member is formed of a material of low gas permeability and small permanent set.

Figure 3:
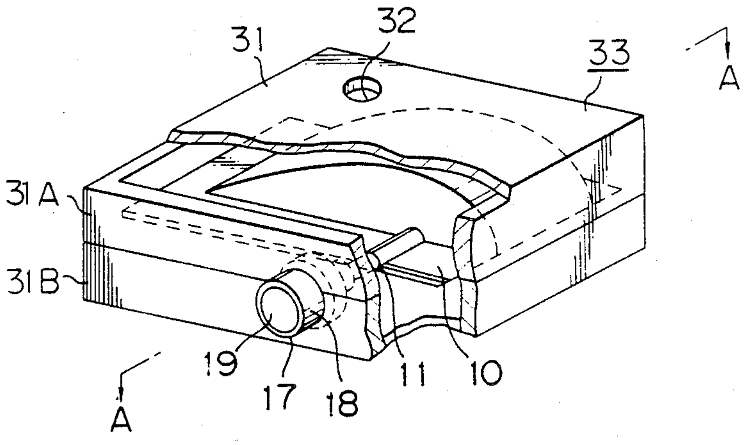
FIG. 3 is a partly broken-away perspective view of the ink cassette of the present invention.
Figure 4:
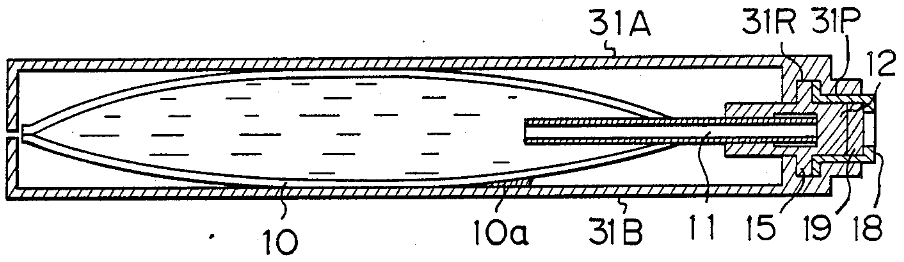
FIG. 4 is a cross-sectional view taken along line A—A of FIG. 3.

FIG. 3 shows an example of a cassette type ink container in which the bag-like ink container 10 shown in FIGS. 1A and 1B is contained in a housing 31 to make the handling thereof easier. FIG. 3 is a partly broken-away perspective view of an ink cassette 33. FIG. 4 is a cross-sectional view taken along line A-A of FIG. 3.

In FIGS. 3 and 4, a coupling member 12 connected to the outlet pipe 11 of the bag-like container 10 is held with the end face of the outer end portion 17 thereof projected from an outer wall forming the same plane of the upper housing 31A and the lower housing 31B of the housing 31 divided into two upper and lower parts, through an opening 31P formed in said outer wall.

Reference numeral 32 designates a vent hole for normally communicating the interior of the housing 31 with the atmosphere. The ink cassette 33 so constructed can be used while being mounted on an ink jet recording apparatus substantially similar to that shown in FIG. 2.

Also, in this ink cassette 33, as shown in FIG. 4, the large-diameter portion 15 of the elastic member 12 is fitted in and fixed to the annular recess 31R in the integral end boss of the housing 31. The annular rigid ring 18 is secured in the boss and has a depending flange that bears against the outer surface of the second elastic member 19. Therefore, even when an extraneous pressure is imparted to the elastic member 12, this elastic member will not slip off from the outer wall of the housing 31 and the connection thereof with a needle-like line, not shown, can be accomplished very easily.

Further, a portion 10A of the bag-like container 10 is joined and fixed to the wall surface of the housing 31 and therefore, there is no possibility of the bag-like container 10 moving in the housing 31 and slipping off from the ink outlet pipe 11 during the handling of the ink cassette 33 to thereby cause leakage of the ink.

Thus, in the present embodiment, the ink cassette 33 is constructed by containing the bag-like container 10 formed of a flexible material in the housing 31 which is a rigid member, whereby during the mounting of the container 10 with respect to an ink jet recording apparatus, it is not necessary to directly touch the flexible bag-like container 10, but the loading operation can be accomplished by gripping the rigid ink cassette 33 and therefore, the handling of the ink cassette becomes very easy.

Figure 5A:
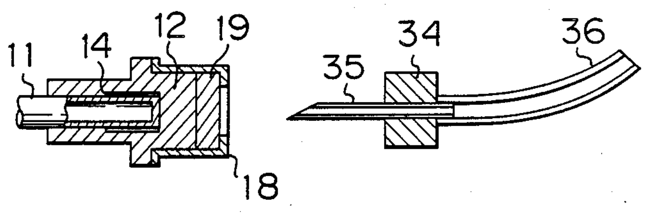
FIGS. 5A and 5B illustrate an example of the coupling portion of the ink container of the present invention.
Figure 5B:
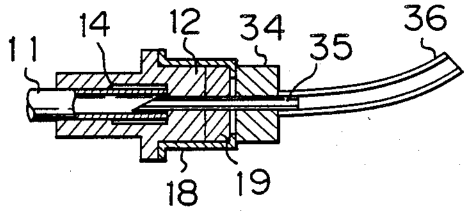

FIGS. 5A and 5B show the details of the coupling portion when the ink cassette 33 is mounted on an ink jet recording apparatus. Reference numeral 34 designates a joint secured to the base bed of the ink jet recording apparatus. A needle-like line 35 is inserted in the central portion of the joint 34. A supply path 36 for supplying ink to the recording head is connected to one end (the right end as viewed in FIG. 5) of the needle-like line 35. When the elastic member 12 of the ink cassette, not shown, is urged against the side edge surface of the joint 34, the needle-like line 35 thereof is inserted into the elastic member 12 and reaches the void 14 thereof. Thus, the bag-like container, not shown, in the ink cassette communicates with the supply path 36 through the outlet pipe 11, so that the supply of ink from the bag-like container to the recording head becomes possible.

By using in combination a member of small gas permeability and a member of small permanent set as the sealing elastic member as shown above, there are brought about the following effects.

By using the elastic member 12 of small gas permeability on that side of the sealing elastic member which contacts the ink, bubbles can be prevented from mixing with the ink in the bag-like ink container 10.

Also, when a hollow needle is thrust into the ink container for the introduction of ink and is removed therefrom after the apparatus has been left unused, leakage of ink is prevented by the different kind of elastic member 19 of small permanent set. Accordingly, the surroundings of the ink cassette are not contaminated during the replacement of the ink cassette.

Figure 6A:
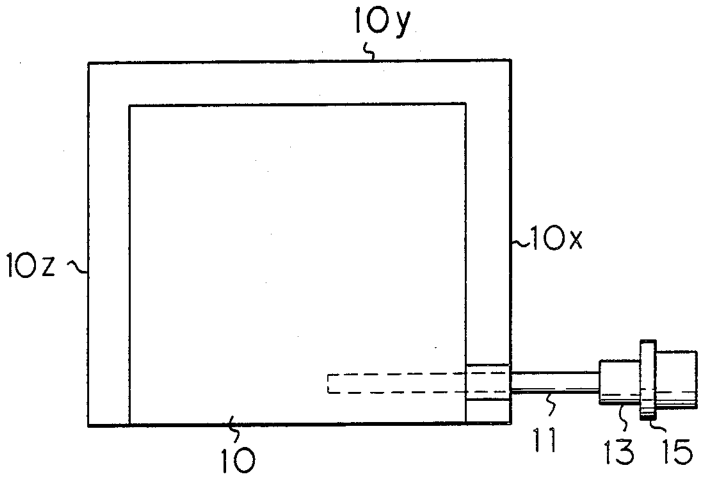
FIGS. 6A and 6B are a top plan view and a partly broken-away side view, respectively, illustrating still a further embodiment of the ink container of the present invention.
Figure 6B:
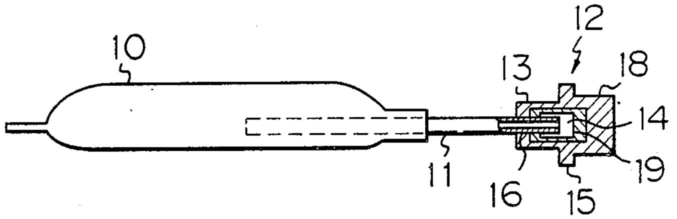

In the above-described embodiment, the elastic member of small gas permeability is disposed on that side of the sealing elastic member which contacts the ink, but as shown in FIGS. 6A and 6B, the elastic member 19 of small permanent set may be disposed on that side which contacts the ink and the elastic member 12 of small gas permeability ma be disposed on that side which contacts the gas (the outer side). In such case, the elastic member 19 is made hollow.

Again in such a construction, the ink is in contact with the elastic member 19 of small permanent set and therefore does not leak even after the needle has been removed, and also, even if the gas permeability of the elastic member 19 is great, bubbles will not mix with the ink because the ink is surrounded by the elastic member 12 of small gas permeability.

In the present invention, an example in which the sealing member is attached to the end of the outlet pipe has been shown, whereas this need not always be attached to the outlet pipe, but of course it may be attached directly to the ink container.

As is apparent from the foregoing description, according to the present invention, a construction is adopted which has a container for storing ink therein and an outlet pipe for directing the ink in the container outwardly and in which the outer end portion of the outlet pipe is mounted on a sealing elastic member formed by a dual structure comprising an elastic member of low gas permeability and an elastic member of small permanent set to thereby seal the container and thus, an excellent ink container which does not contaminate its surroundings during the mounting or dismounting thereof and in which bubbles do not mix with the ink can be provided simply and inexpensively. According to the air entry test at a high temperature (60° C.), where only Tore-Silicone SH841U was used, the air entry could be intercepted for 6 hours, whereas by making IIR268 and Tore-Silicone SH841U into a dual structure as shown in FIG. 1B, the air entry could be intercepted for 60 hours or more.

I claim:

1. An ink cartridge for an ink jet recording apparatus comprising:

a flexible ink bladder for storing ink therein;

a case containing said ink bladder;

an outlet pipe having an outlet port for directing the ink in said ink bladder outwardly thereof; and a sealing closure member fitted into said case and sealing said outlet port, said closure member comprising:

a first elastic member of low gas permeability selected from the group of materials consisting essentially of butyl rubber, polychloroprene rubber, nitrile rubber, isobutylene rubber and polysulfide rubber, and a second elastic member, with a compression permanent set lower than said first elastic member, selected from the group of materials consisting essentially of silicon rubber, urethane rubber, polyethylene chloride, eipchlorohydrin rubber, nitrile rubber (N13R), isoprene rubber, butadiene rubber, chloroprene rubber and fluororubber, wherein said first elastic member and said second elastic member are disposed in that order from said outlet port.

2. An ink cartridge according to claim 1, wherein said elastic members forming said sealing closure member are brought into intimate contact with each other by an annular rigid ring.

3. An ink cartridge according to claim 2, wherein said rigid ring is a metal.

4. An ink cartridge according to claim 1, wherein said elastic members forming said sealing closure member are fitted to each other by fitting portions in said elastic members.

5. A ink cartridge according to claim 1, wherein said flexible ink bladder is laminated structure of polymeric film.

6. An ink cartridge according to claim 1, wherein said flexible ink bladder is joined and fixed to said case.

7. An ink cartridge according to claim 1, wherein said second elastic member has a compression permanent set of less than 10% (70±1° C./22 hours), when measured in accordance with JIS K6301-1975.

8. An ink cartridge according to claim 1, wherein said portion includes an integral end boss and a rigid ring secured in said boss and having a depending flange bearing against an outer surface of said second elastic member.

* * * * *

UNITED STATES PATENT AND TRADEMARK OFFICE
CERTIFICATE OF CORRECTION

PATENT NO. : 4,928,126

DATED : May 22, 1990

INVENTOR(S) : Naohito Asai

It is certified that error appears in the above-identified patent and that said Letters Patent is hereby corrected as shown below:

On the title page, Item [75] should read:

--Naohito Asai, Hiratsuka, Japan--.

Item [73] should read:

--Canon Kabushiki Kaisha, Tokyo, Japan--.

ATTORNEY, AGENT OR FIRM, should read:

--Fitzpatrick, Cella, Harper & Scinto--.

UNITED STATES PATENT AND TRADEMARK OFFICE

CERTIFICATE OF CORRECTION

PATENT NO. : 4,928,126
Page 2 of 4
DATED : May 22, 1990
INVENTOR(S) : NAOHITO ASAI It is certified that error appears in the above-identified patent and that said Letters Patent is hereby corrected as shown below:

COLUMN 2

Line 62, "nitrite" should read --nitrile--.

COLUMN 3

Line 6, "rubber urethane" should read --rubber, urethane--.
Line 10, "silicon" should read --silicone--.
Line 16, "silicone" should read --Silicone--.
Line 17, "silicon" should read --silicone--.

COLUMN 5

Line 32, "ma" should read --may--.

COLUMN 6

Lines 10-32, claim 1 should read as follows:

--1. An ink cartridge for an ink jet recording apparatus comprising:

a flexible ink bladder for storing ink therein;

an outlet pipe having an outlet port for directing the ink in said ink bladder outwardly thereof;

a sealing closure member sealing said outlet port and disposed to enable insertion of a needle axially into said outlet port by puncturing said sealing closure member in order to feed ink from said ink bladder to the recording apparatus, said sealing closure member comprising:

UNITED STATES PATENT AND TRADEMARK OFFICE
CERTIFICATE OF CORRECTION

PATENT NO. : 4,928,126

DATED : May 22, 1990

INVENTOR(S) : NAOHITO ASAI

It is certified that error appears in the above-identified patent and that said Letters Patent is hereby corrected as shown below:

COLUMN 6

Lines 10-32, cont'd.

a first elastic member of low gas permeability selected from the group of materials consisting essentially of butyl rubber, polychloroprene rubber, nitrile rubber, isobutylene rubber and polysulfide rubber, and a second elastic member, with a compression permanent set lower than said first elastic member, selected from the group of materials consisting essentially of silicone rubber, urethane rubber, polyethylene chloride, epichlorohydrin rubber, nitrile rubber (N13R), isoprene rubber, butadiene rubber, chloroprene rubber and fluororubber, wherein said first elastic member and said second elastic member are disposed in that order from said outlet port; and a case containing said ink bladder and including a portion in which said sealing closure member is fitted and captured internally to bring said first and second closure members into intimate contact.--.

UNITED STATES PATENT AND TRADEMARK OFFICE
CERTIFICATE OF CORRECTION

PATENT NO. : 4,928,126

DATED : May 22, 1990

INVENTOR(S) : NAOHITO ASAI

It is certified that error appears in the above-identified patent and that said Letters Patent is hereby corrected as shown below:

COLUMN 6

Line 44, "laminated" should read --a laminated--.

Signed and Sealed this

Ninth Day of April, 1991

*Attest:*

HARRY F. MANBECK, JR.

*Attesting Officer*

*Commissioner of Patents and Trademarks*